United States Patent
Wobben

[11] Patent Number: 6,157,556
[45] Date of Patent: Dec. 5, 2000

[54] SWITCHED INVERTER CIRCUIT PROVIDING INCREASED SHORT CIRCUIT PROTECTION

[76] Inventor: Aloys Wobben, Argestrasse 19, D-26607 Aurich, Germany

[21] Appl. No.: 09/242,526

[22] PCT Filed: Jun. 6, 1998

[86] PCT No.: PCT/EP98/03401

§ 371 Date: May 14, 1999

§ 102(e) Date: May 14, 1999

[87] PCT Pub. No.: WO98/58441

PCT Pub. Date: Dec. 23, 1998

[30] Foreign Application Priority Data

Jun. 17, 1997 [DE] Germany .................. 197 25 629

[51] Int. Cl.[7] .................................. H02M 7/5387
[52] U.S. Cl. ........................................ 363/132; 363/56
[58] Field of Search ................ 363/132, 17, 16, 363/56

[56] References Cited

U.S. PATENT DOCUMENTS

| | | | |
|---|---|---|---|
| 4,585,986 | 4/1986 | Dyer | 363/17 |
| 4,768,141 | 8/1988 | Hubertus et al. | 363/16 |
| 4,951,187 | 8/1990 | Herbert Stemmler | 363/96 |
| 5,025,360 | 6/1991 | Latos | 363/16 |
| 5,657,219 | 8/1997 | Stanley | 363/132 |

FOREIGN PATENT DOCUMENTS

| | | |
|---|---|---|
| 0 462 547 A2 | 6/1990 | European Pat. Off. . |
| 0 599 334 A2 | 6/1994 | European Pat. Off. . |
| 38 19 097 | 12/1989 | Germany . |
| 41 14 968 A1 | 5/1991 | Germany . |
| 1108571 | 4/1965 | United Kingdom . |
| WO 90/07820 | 7/1990 | WIPO . |

OTHER PUBLICATIONS

Dec. 1988, Erich Hau "Windkraftanlagen", Springer Verlag, pp. 287–310.

*Primary Examiner*—Shawn Riley
*Attorney, Agent, or Firm*—Altera Law Group, LLC

[57] ABSTRACT

An inverter inputs sinusoidal currents into an alternating current network. The inverter reduces the risk of short circuiting. One switching unit is used to generate a semi-oscillation of a sinusoidal oscillation. In order to generate a positive semi-oscillation of a sinusoidal oscillation, a second switching unit is used in addition to the one used to generate the negative component of a sinusoidal current. As a result, only one switch pertaining to a switching unit is clocked or actuated to generate a positive semi-oscillation. Another switch is clocked or actuated to generate a negative semi-oscillation of sinusoidal current. The risk of a short circuit between both switches is reduced to the period occurring between switching from the positive to the negative or from the negative to the positive semi-oscillation.

13 Claims, 7 Drawing Sheets

Positive component

Fig. 1

Negative component

SWITCHED INVERTER CIRCUIT PROVIDING INCREASED SHORT CIRCUIT PROTECTION

FIELD OF THE INVENTION

The invention relates to an inverter for inputting sinusoidal currents into an alternating current network or a public power supply network.

BACKGROUND

Figure 13:
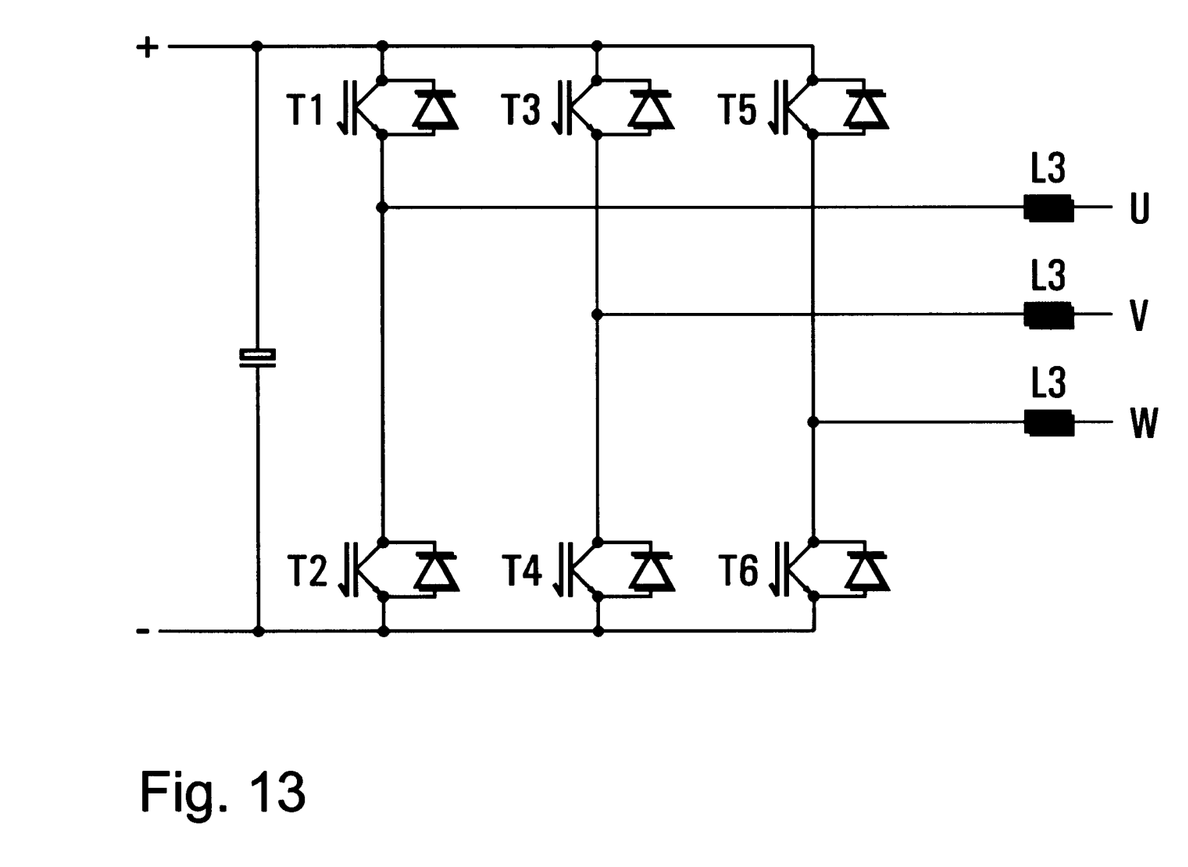
FIG. 13 illustrates a circuit diagram of the known inverter.

The power switches used to form such inverters are almost exclusively executed in a three-phase bridge configuration, as shown in FIG. 13. Such an inverter generates multi-phase alternating current with three phases U, V, and W, from a dc voltage source. The antiparallel switching of power switches T1 to T6, shown in FIG. 13, using corresponding diodes, enables four-quadrant operation, and thus allows many applications for such an inverter circuit.

The disadvantage of such an inverter circuit is that in the event of a short circuit across two switches, e.g. T1 and T2, extremely large energy flows occur, which typically causes complete destruction of the inverter, perhaps even starting a fire which leads to the destruction of all connected system components.

SUMMARY OF THE INVENTION

The objective of the present invention is to improve resistance to short circuits occurring and to reduce the risks thereof.

This invention achieves this objective through an inverter including two switching units connected in either parallel or series, a first of the switching units generating positive components of the [mains] sinusoidal current and the second switching unit generating negative components of the current. Each of the switching units includes a respective switch and a corresponding capacitive diode connected in series, and a corresponding tap-off located between said respective switch and said respective capacitive diode, said two switching units each being decoupled by at least one respective inductance and coupled through at least one common inductance to an output.

The invention is based on the principle of using only a single switching unit in the generation of a semi-oscillation of a sinusoidal oscillation. Thus, a different switching unit is used for generating the positive semi-oscillation of the sinusoidal oscillation than is used for generating the negative component. As a result, only one switch of a switching unit is clocked or actuated in the generation of a positive semi-oscillation, while a different switch is active in the generation of the negative semi-oscillation of a sinusoidal current. The danger of a short circuit between the two switches is thus limited to the time during the changeover from the positive to the negative, or from the negative to the positive, semi-oscillation.

In addition, only a single switching unit is responsible for the generation of a semi-oscillation of a sinusoidal oscillation, so that the switching units that are responsible for different semi-oscillations can be physically separated. This improves the safety of the switching system components and simplifies the spatial arrangement.

A preferred embodiment of this invention is characterized by the fact that a supplied dc voltage is divided into a first and a second partial dc voltage. The first partial dc voltage is used, e.g. for the generation of the positive component of the mains current, and the second partial dc voltage is used for the generation of the negative component. As an example, let the values of the two partial dc voltages be 660V each, resulting in a total dc voltage of 1320V. The components used in the first switching unit only have to be able to process the first partial dc voltage, while the components of the second switching unit are maximally loaded by the second partial dc voltage. The equivalent is true for inductances and potential semiconductor switching elements connected to the switching units. Thus, considerable cost savings are possible since the components do not have to be designed to be as puncture proof as in the known inverter of FIG. 13. In other words, the output power of the whole inverter can be doubled, while using components that only have to process a partial dc voltage.

BRIEF DESCRIPTION OF THE DRAWINGS

The invention is explained further in the following by drawings of an embodiment example.

DETAILED DESCRIPTION

Figure 1:
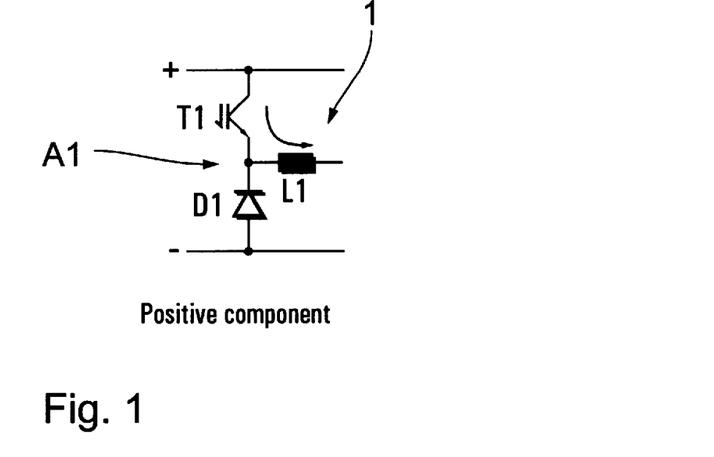
FIG. 1 illustrates a basic circuit of a switching unit for generating the positive component of the mains current.

FIG. 1 shows the circuit diagram of a cross arm or switching unit 1, for generating the positive component of an alternating or three-phase current output from a dc voltage. The switching unit consists of a power switch T1, e.g. an IGBT (isolated gate bipolar transistor) or GTO (gate turn off), and a diode D1, which are connected in series to the dc voltage connections. Located between the switch T1 and the diode D1 is a current tap-off point A1, from which current is tapped off by an inductor L1.

Figure 2:
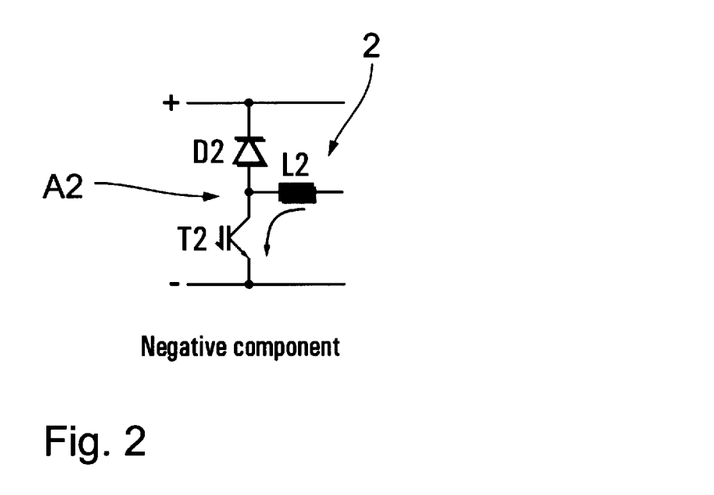
FIG. 2 illustrates a basic circuit of a switching unit for generating the negative component of the mains current.

FIG. 2 illustrates a basic circuit of a switching unit 2 for generating the negative component of an alternating or three-phase mains current output. The switching unit 2 includes a series connected power transistor T2, a diode D2, a current tap-off A2 in between the transistor T2 and the diode D2, and an inductor L2 connected on the load side.

Figure 3:
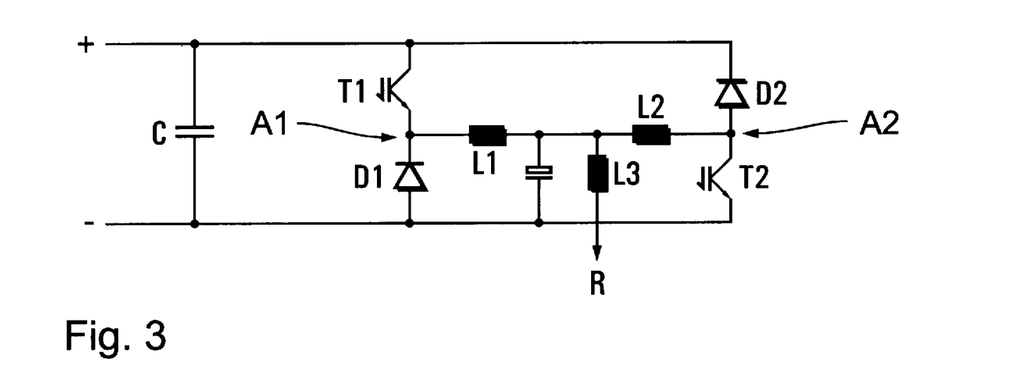
FIG. 3 illustrates a basic circuit for generating current of one phase using the circuits of FIGS. 1 and 2.

FIG. 3 shows switching units 1, 2, as described in FIGS. 1 and 2, connected in parallel, using an additional inductor L3 as a coupling inductance. A capacitor C is connected to the dc supply network in parallel with the switching units 1, 2.

Figure 4:
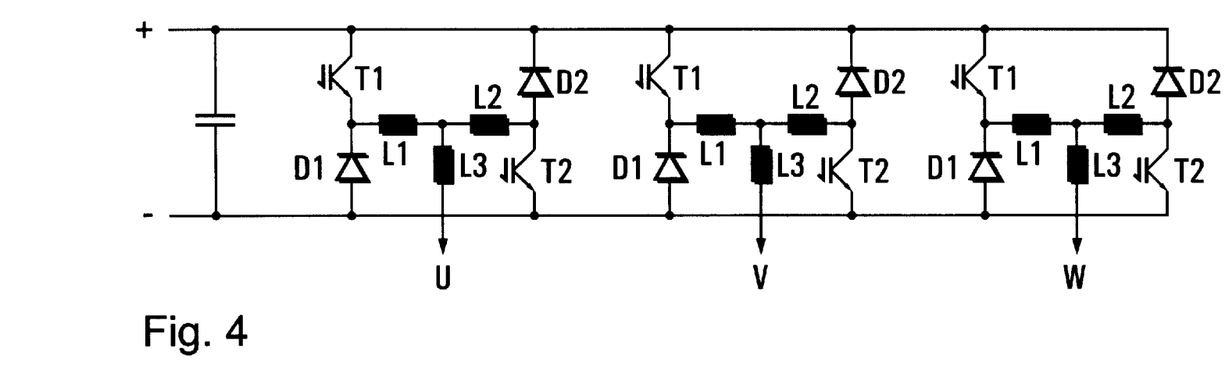
FIG. 4 illustrates a basic circuit of an interconnection of several switching units, according to FIGS. 1 and 2, to generate a current output having three phases U, V, and W.

FIG. 4 shows how three first and three second switching units, of FIG. 3, are interconnected to generate a three-phase mains currents with phases U, V, and W.

Figure 5:
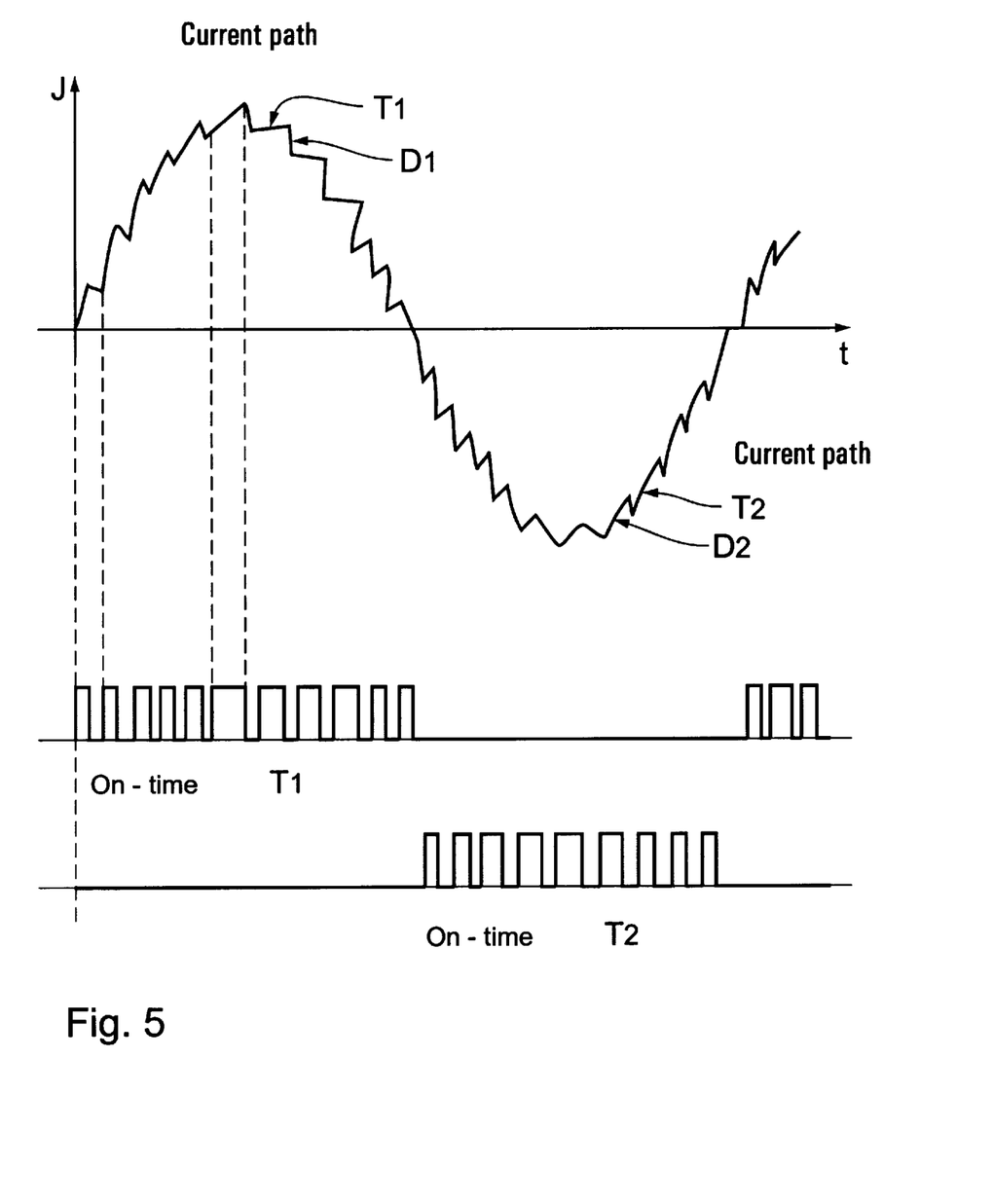
FIG. 5 is a graph illustrating current behavior and timing for triggering switches T1 and T2 of the first and second switching units.

FIG. 5 shows in a timing chart the clocking of switches T1 and T2 used to obtain a sinusoidal current for, e.g., the phase U. Only switch T1 is switched on and off in an assigned timing pattern during the positive half-wave of the sinusoidal current, switch T2 is inactive during the time that T1 is clocked. A "jagged" sinusoidal current is generated by timing the ON and OFF states of witch T1. Switch T1 is inactive during the generation of the negative half-wave of the sinusoidal current, and only switch T2 is switched on and off in predetermined time and clock intervals. The shown "jagged" current behavior is a result of the current path and the interaction of transistor T1 with diode D1 or transistor T2 with diode T2, as shown in FIG. 5. Note that, while operating near the maximum current point of each positive or negative half-cycle, the switches T1 and T2 are in the "on" position for longer durations than during operation at parts of the respective half-cycles where the current magnitude is lower.

Figure 6:
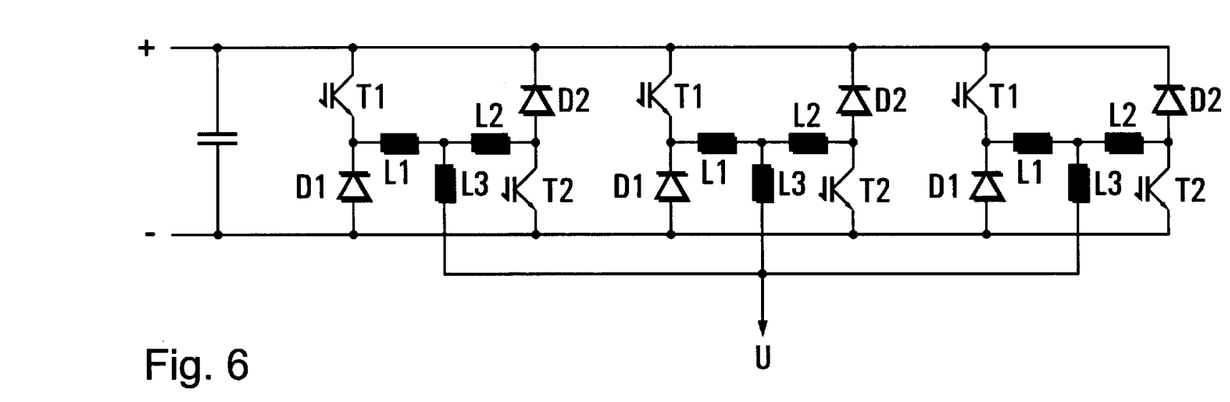
FIG. 6 illustrates a basic circuit, showing how the circuit of FIG. 4 may be adapted for generating current of one phase.

FIG. 6 shows how the circuit of FIG. 4 is adapted to form a single switching unit for phase U, by interconnecting three first and second switching units 1, 2. Current overshoots can be drastically reduced by such an interconnection and by time-shifted switching on and off of the corresponding power switches T1 and T2 of the individual switching units, while the individual switching units or circuit modules are connected in parallel by the inductor L3.

Figure 7:
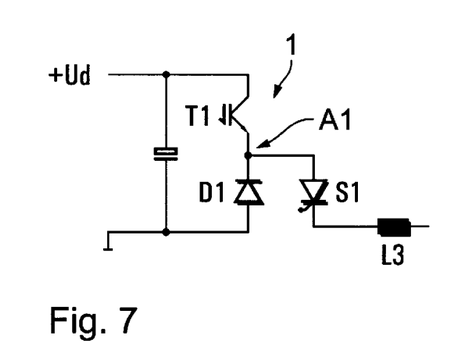
FIG. 7 illustrates a basic circuit of a switching unit for generating the positive component of the mains current with an additionally interconnected thyristor.

In the circuit of FIG. 7, a first switching element S1, such as a thyristor, is connected between the current tap-off A1 of the first switching unit 1, generating the positive component of the mains current, and the inductance L3, connected on the load side. In the same manner, as is shown in FIG. 8, a second switching element S2 is provided between the current tap-off A2 of the second switching unit 2, generating the negative component of the mains current, and the inductance L3.

Figure 8:
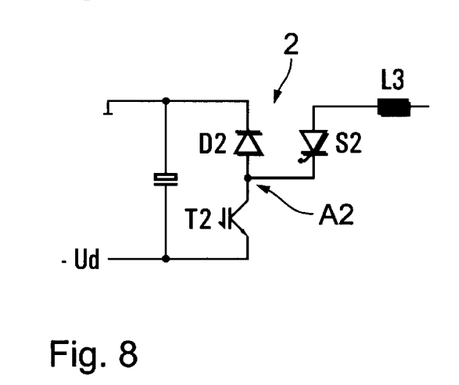
FIG. 8 illustrates a basic circuit of a switching unit for generating the negative component of the mains current with an additionally interconnected thyristor.
Figure 9:
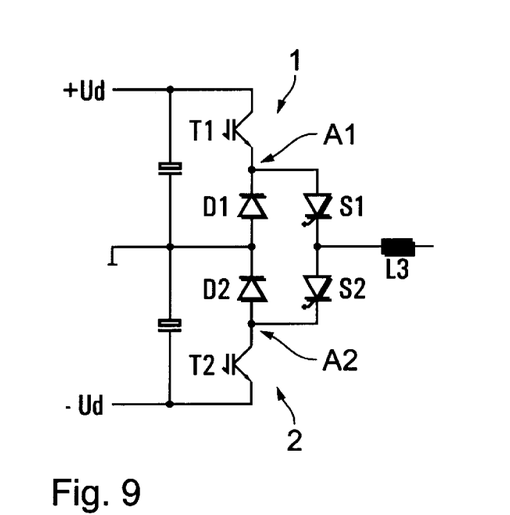
FIG. 9 illustrates a basic circuit for generating current of one phase using the circuits of FIGS. 7 and 8.

FIG. 9 shows a series connection of the switching units shown in FIGS. 7 and 8, whereby the inductance L3 is used as common coupling inductance. In this interconnection of switching units 1, 2, the supplied dc voltage is divided into two partial dc voltages, +Ud, −Ud, of equal magnitude. The two capacitive diodes D1, D2 are connected to ground.

Figure 10:
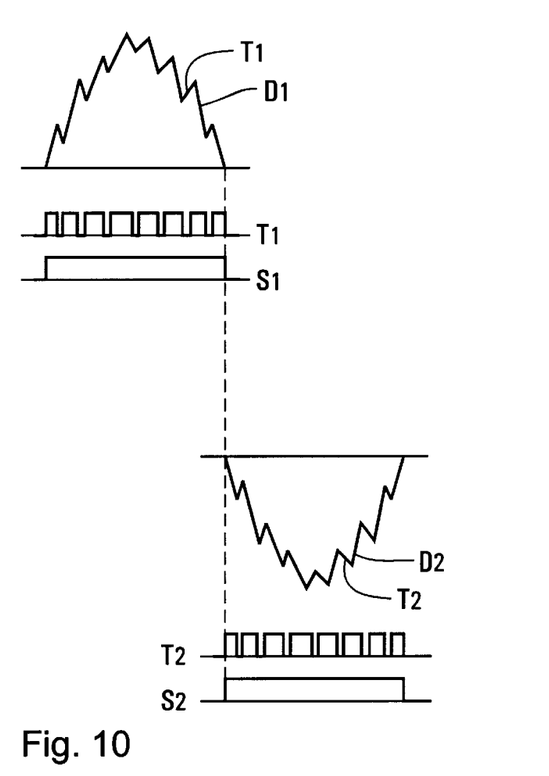
FIG. 10 is a graph illustrating current behavior and timing for triggering switches T1, S1, T2, and S2 in the circuit of FIG. 9.

The timing chart of FIG. 10 illustrates how the switches T1 and T2, as well as the switching elements S1 and S2, are clocked to obtain a single phase sinusoidal current. During the positive half-wave of the sinusoidal current, the switch T1 is switched on and off according to an assigned clocking pattern, while the switching element S1 is switched on during the entire positive half-wave. Switch T2 and switching element S2 are switched off during this time. By clocking the ON and OFF states of switch T1, similar to the time behavior illustrated in FIG. 5, a "jagged" sinusoidal current is generated. Switches T1 and S1 are switched off during the generation of the negative half-wave of the sinusoidal current, and switch T2 is switched on and off in predetermined time and clock intervals, so that the negative half-wave of the sinusoidal current is generated. Switching element S2 is switched on during the entire negative half-wave.

Figure 11:
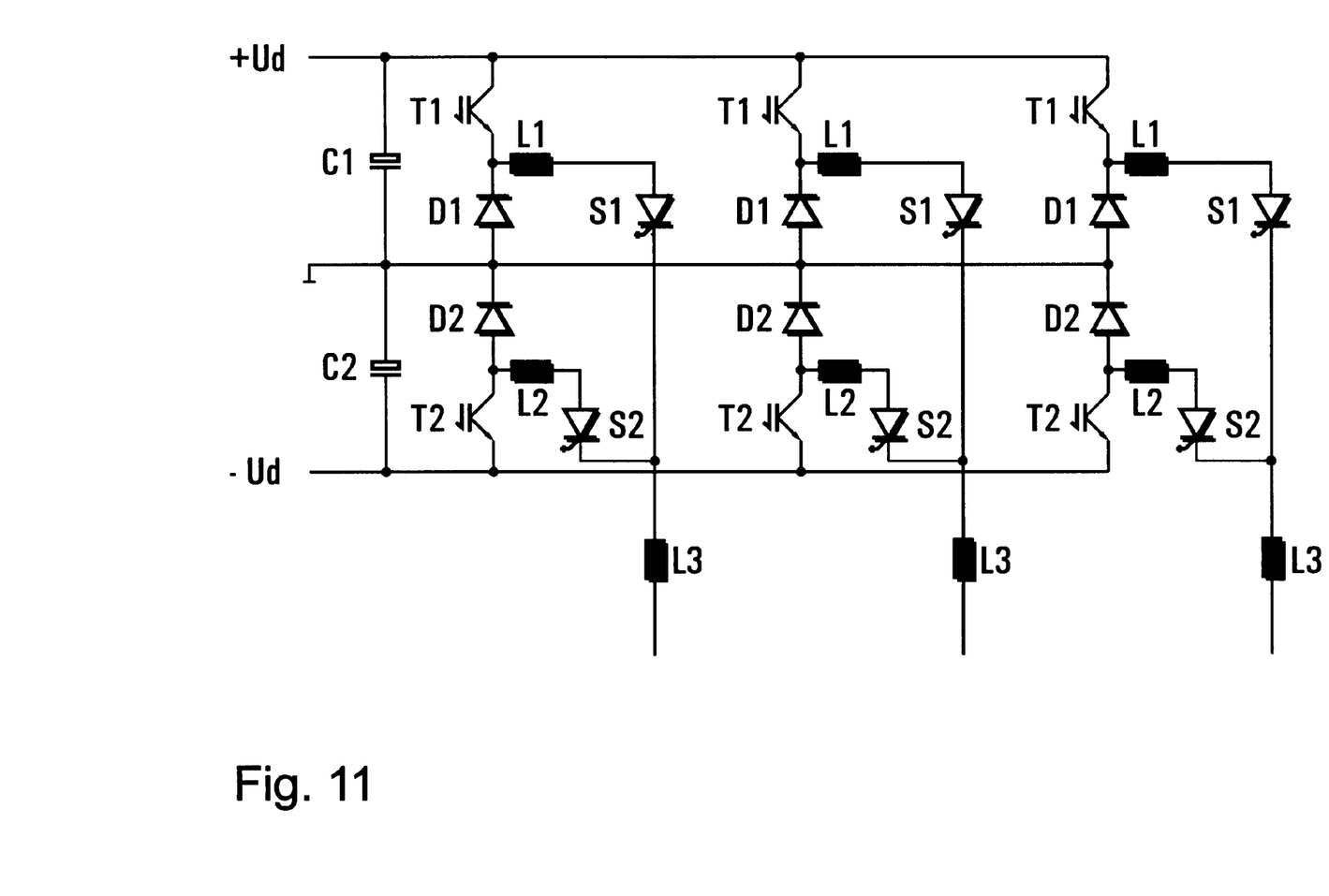
FIG. 11 illustrates a circuit of a first embodiment incorporating several switching circuits of FIGS. 7 and 8 to generate a current output having three phases U, V, and W.

The circuit illustrated in FIG. 11 shows how three first and second switching units 1, 2 as shown in FIG. 9, can be interconnected to generate a three-phase mains output current with phases U, V, and W. In this embodiment, an additional inductor L1 or L2 is connected between each current tap-off, A1 or A2, and the corresponding following switching element, T1 or T2.

Figure 12:
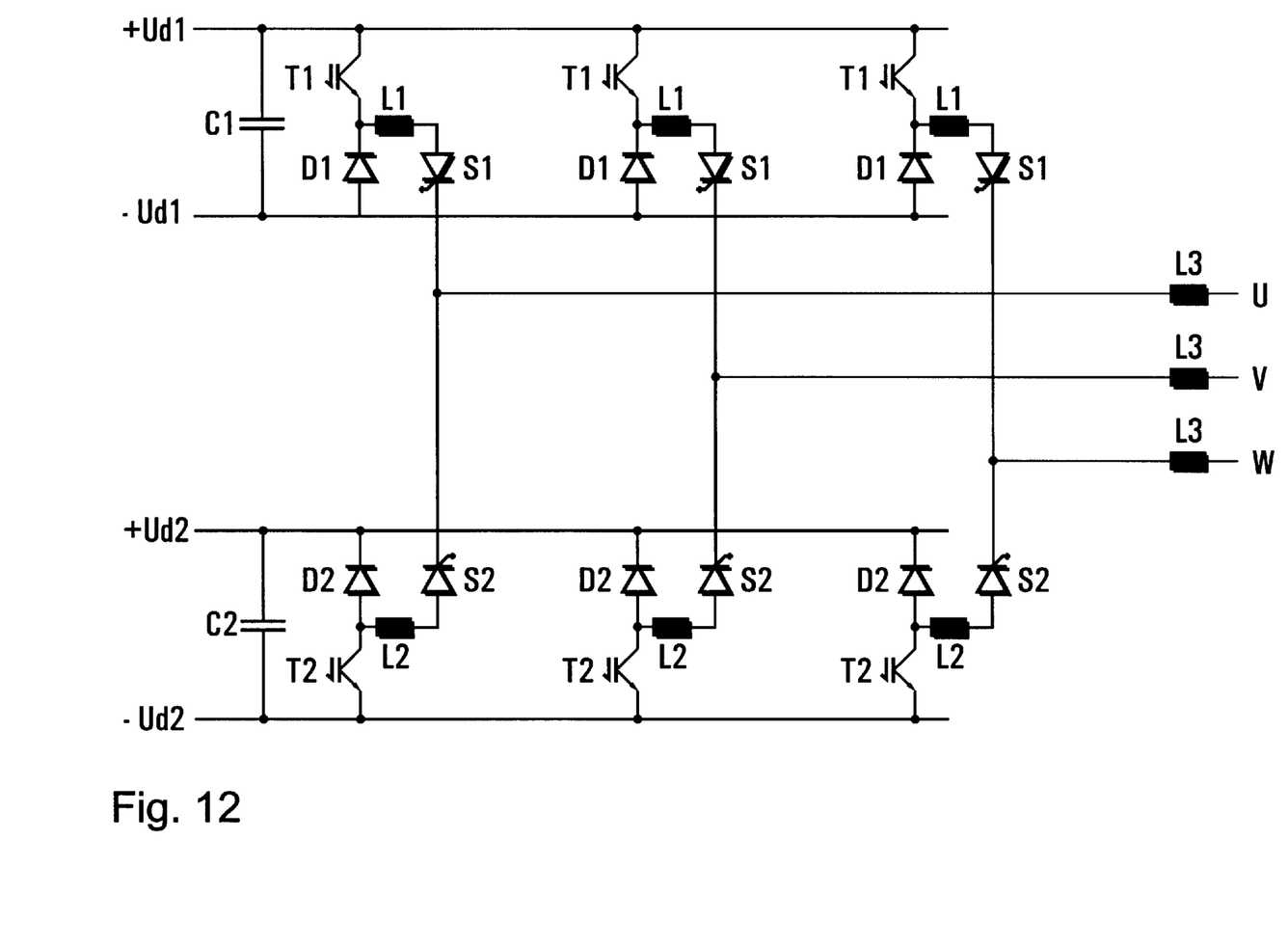
FIG. 12 illustrates a circuit of a second embodiment incorporating several switching circuits of FIGS. 7 and 8 to generate current with three phases U, V, and W.

FIG. 12 illustrates a circuit for generating three-phase mains current with phases U, V, W. The supplied dc voltage is divided into two partial dc voltages, ±Ud1 and ±Ud2, which sum to the total dc voltage Ud. The corresponding diodes D1 and D2 are not connected to ground, but to −Ud1 or +Ud2, as shown in FIG. 12.

FIG. 13 shows the circuit of a known inverter allowing four-quadrant operation by using an antiparallel connection of power switches T1–T6 with diodes D1–D6. This circuit has many applications, but also has a very high risk of a very severe short circuit in case of a short circuit across two switches, e.g. T1 and T2. This can lead to the complete destruction of the inverter and possibly, if a fire starts, to the complete destruction of all adjacent system components. To generate the positive half-wave of the output sinusoidal current, the known inverter successively switches on and off, for example, switches T1 and T2. This means that for each half-wave, T1 and T2 must be switched on or off several consecutive times during the half-wave, which significantly increases the statistical probability of a short circuit compared to the invention's solution according to FIG. 5.

Severe short circuits are prevented in the interconnection of individual switching units according to the present invention—see for example FIG. 3. The invention uses separate current branches, i.e. positive and negative cross arms. If switches T1 and T2 in the embodiments of FIGS. 3, 4, and 5 should fail, then these are decoupled and protected from each other by the inductances L1 and L2. In the embodiments in FIGS. 9, 11, and 12, the diodes D1 and D2, as well as the switches S1 and S2, reduce the risk of a short circuit.

The spatial arrangement of the two cross arms—positive, negative—can be separated, whereby the mechanical layout of the inverter is simplified. Inverters of very high power can be constructed using the inverter embodiments illustrated in FIG. 3 or FIGS. 4 and 6, as well as FIG. 9 or FIGS. 11 and 12.

The decoupling impedances L1 and L2, between the switches of two interconnected switching units, can be used as high frequency choke, and also as filter for a reduction in dU/dt. Thus, any parasitic radiation is already drastically reduced immediately after the power switches T1 and T2.

What is claimed is:

1. An inverter for inputting sinusoidal currents into an alternating current network, comprising:
   two switching units connected in one of a parallel and a series configuration, a first of said switching units generating positive components of the sinusoidal current, the second of said switching units generating negative components of the sinusoidal current;
   whereby each of said switching units contains a respective switch and a corresponding capacitive diode connected in series, and a corresponding tap-off located between said respective switch and said respective capacitive diode, said two switching units each being decoupled by at least one respective inductance and coupled to an output through at least one common inductance, the respective decoupling inductances and the common inductance being coupled to the respective switching units through the respective tap-offs.

2. The inverter of claim 1 wherein the switching units each further include a first switching element interconnected between said respective current tap-off and said common inductance.

3. The inverter of claim 2 wherein the first switching element of the first switching unit is switched on and the first switching element of the second switching unit is switched off during generation of the positive components of the current, and the first switching element of the second switching unit is switched on and the first switching element of the first switching unit is switched off during generation of the negative components.

4. The inverter of claim 1 wherein a dc voltage is divided into a first partial dc voltage and a second partial dc voltage; and the first partial dc voltage drops off at said first switching unit for generating the positive component, and the second partial dc voltage drops off at said second switching unit for generating the negative component, and said second switching unit is connected in series with said first switching unit.

5. The inverter of claim 4 wherein the two partial dc voltages are of equal magnitude and said two capacitive diodes are each connected to ground.

6. The inverter of claim 1 wherein at least three first and three second interconnected said switching units are provided and arranged for generating three phase current.

7. The inverter of claim 1 wherein said first and second switching units are spatially separated.

8. The inverter of claim 1 wherein only one of said switches is repeatedly switched on or off during the generation of a semi-oscillation of a sinusoidal oscillation.

9. The inverter of claim 8 wherein only said first switching unit is repeatedly switched on or off at definite time intervals for generating the positive semi-oscillation, and only said second switching unit is repeatedly switched on or off at definite time intervals for generating the negative semi-oscillation.

10. The inverter of claim 8 wherein ON-state clock cycles of each switch are longer in the area of peak current magnitude than in the area of zero crossing of a sinusoidal halfwave.

11. The inverter of claim 1 wherein a plurality of first and second said switching units are interconnected to generate current of a single phase.

12. An inverter for inputting sinusoidal currents into an alternating current network, comprising:

two switching units connected in one of a parallel and a series configuration, a first of said switching units generating positive components of the sinusoidal current, the second of said switching units generating negative components of the sinusoidal current;

each of said switching units including a respective switch and a corresponding capacitive diode connected in series, and a corresponding tap-off located between said respective switch and said respective capacitive diode, said two switching units each being decoupled by at least one respective inductance coupled at one end to the respective tap-off and coupled by at least one common inductance to an output, each of said switching units further including a second switching element interconnected between said respective current tap-off and said common inductance.

13. An electric generator producing a sinusoidal output, comprising:

a wind generator producing a d.c. electrical output; and two switching units connected to the d.c. electrical output of the wind generator in one of a parallel and a series configuration, a first of said switching units generating positive components of the sinusoidal current, the second of said switching units generating negative components of the sinusoidal output;

whereby each of said switching units contains a respective switch and a corresponding capacitive diode connected in series, and a corresponding tap-off located between said respective switch and said respective capacitive diode, said two switching units each being decoupled by at least one respective inductance and coupled to an output through at least one common inductance.

* * * * *